US005636185A

United States Patent [19]

Brewer et al.

[11] Patent Number: 5,636,185

[45] Date of Patent: Jun. 3, 1997

[54] DYNAMICALLY CHANGING LIQUID CRYSTAL DISPLAY TIMEKEEPING APPARATUS

[75] Inventors: Donald R. Brewer, San Diego; Michael Jarcho, La Mesa, both of Calif.

[73] Assignee: Boit Incorporated, San Diego, Calif.

[21] Appl. No.: 402,008

[22] Filed: Mar. 10, 1995

[51] Int. Cl.[6] .......... G04B 19/06; G04C 19/00; G02F 1/137

[52] U.S. Cl. .......... 368/84; 368/232; 368/242; 349/165

[58] Field of Search .......... 368/82–84, 239–242; 359/85, 98

[56] References Cited

U.S. PATENT DOCUMENTS

| | | | |
|---|---|---|---|
| 3,969,887 | 7/1976 | Fukumoto | 58/50 |
| 4,212,159 | 7/1980 | Noble et al. | 368/82 |
| 4,213,294 | 7/1980 | Freeman | 368/82 |
| 4,385,842 | 5/1983 | Wiesner | 368/242 |
| 4,400,092 | 8/1983 | Piquet et al. | 368/82 |
| 4,413,915 | 11/1983 | Besson | 368/71 |
| 4,435,046 | 3/1984 | Nishimura | 350/334 |
| 4,488,818 | 12/1984 | Saurer et al. | 368/71 |
| 4,647,217 | 3/1987 | Havel | 368/10 |
| 4,707,141 | 11/1987 | Havel | 368/11 |
| 4,933,104 | 6/1990 | Ivaschenko et al. | 252/299.1 |
| 5,008,869 | 4/1991 | Dweck | 368/228 |
| 5,008,870 | 4/1991 | Vessa | 368/242 |
| 5,228,013 | 7/1993 | Bik | 368/223 |
| 5,289,301 | 2/1994 | Brewer | 359/98 |
| 5,418,760 | 5/1995 | Kawashima et al. | 368/69 |
| 5,455,808 | 10/1995 | Grupp et al. | 368/82 |

*Primary Examiner*—Vit W. Miska
*Attorney, Agent, or Firm*—Fitch, Even, Tabin & Flannery

[57] ABSTRACT

A dynamically changing, multi-color liquid crystal display for electronic watches or other design apparel items is provided. The liquid crystal displays incorporated within the watch or designer apparel item can be adapted to provide various colored images such as geometric images, animation images, customized images, designer labels, logos, etc. on colored backgrounds or alternatively provides a color changing capability that is aesthetically pleasing and fashionable. Moreover, the dynamically changing watch or other designer apparel item allows for the electronic control of the color appearance of the liquid crystal displays as well as electronic control of the liquid crystal display images, such images being generally independent of the time of day.

23 Claims, 3 Drawing Sheets

DYNAMICALLY CHANGING LIQUID CRYSTAL DISPLAY TIMEKEEPING APPARATUS

BACKGROUND OF THE INVENTION

The present invention generally relates to an electronic timekeeping apparatus and, more particularly, relates to an electronic timekeeping apparatus with a dynamically changing liquid crystal display that allows electronically controlled color change of the liquid crystal display elements. Moreover, the present invention also allows electronic control of multi-colored liquid crystal display images, such images being generally independent of the time of day or alternatively provide a multi-colored indication of the time of day in an analog representation.

A wide variety of electronic timepieces utilizing liquid crystal display elements for time indication have been developed with great commercial success. Most of these electronic timepieces indicate the time in the form of numerals or in what is often referred to as a digital time display. More recently, the related art have fashioned liquid crystal displays for electronic watches that represent time in an analog or conventional type form.

Much of this related art in the field of electronic timekeeping devices with liquid crystal displays offers a variety of designs and configurations of the liquid crystal display elements that dynamically change to indicate the time-of-day. For example, U.S. Pat. No. 3,969,887 issued to Fukumoto (Jul. 20, 1976) shows an electronic timepiece composed of many liquid crystal display elements arranged in hour and minute indicating sections which are selectively activated in various display patterns so that the time is indicated in an analog form.

Another example is U.S. Pat. No. 4,212,159 issued to Nobel et al. (Jul. 15, 1980) which discloses an electronic timepiece with a liquid crystal display simulating a conventional mechanical analog timepiece. The liquid crystal material in Nobel et al. disclosure is activated in selected areas to change the appearance of the display to simulate movement of hands in an analog timepiece.

U.S. Pat. No. 4,213,294 issued to Freeman (Jul. 22, 1980) is one of many U.S. patents which disclose an electronic timepiece composed of many liquid crystal display elements that when activated simulate the positions of the hour and minute hands in an analog timepiece. Freeman utilizes 24 or 60 individual minute display elements shaped to combine with 12 or 24 hour display elements which are selectively activated to represent the indicated time in analog form.

Other related art includes U.S. Pat. No. 4,385,842 issued to Wiesner (May 31, 1983) which discloses an electronic watch which has a liquid crystal display that presents an analog indication of time in a conventional presentation of hour, minute and second hands that circulate around the watch face. Also, U.S. Pat. No. 4,435,046 issued to Nishimura (Mar. 6, 1984) that utilizes an analog display comprising conventional mechanical hour and minute hands together with a liquid crystal display wherein the activated segments of the liquid crystal display are isolated or separated from the analog display area.

Still other designs have introduced color changing schemes for providing indication of time as is shown in U.S. Pat. Nos. 4,647,217 (Mar. 3, 1987); and 4,707,141 (Nov. 17, 1987) both issued to Havel, which show variable color digital and analog timepieces, respectively. See also U.S. Pat. No. 5,228,013 issued to Bik (Jul. 13, 1993) which utilizes multiple liquid crystal display elements that change color to indicate time in a non-conventional form.

Many existing liquid crystal displays used in timepieces utilize conventional twisted-nematic (TN) displays that generally have a black on grey appearance. In addition, polarizing films, both external and reflective are typically incorporated within such devices which tends to diminish the brightness of the display and limit the viewing angles at which the display is clearly visible. Color appearance of the liquid crystal display is introduced through the use of colored filters, colored background lighting, and the like. However, when the appearance of color is incorporated with such timekeeping devices, the colors are often preselected and static.

The above-described and related references typically employ liquid crystal displays that include static background display elements coupled with active or dynamic time indicating display elements. As such, the aesthetic presentation of the liquid crystal display is limited by the functional aspect of the device.

More recent advancements in liquid crystal displays have disclosed the use of guest dyes within the liquid crystal material to provide color modulation. See for example, U.S. Pat. No. 5,289,301 issued to inventor-applicant Donald Brewer (Feb. 22, 1994) which suggests the broad concept of using color modulation liquid crystal displays in a wristwatch in some non-enabled manner.

SUMMARY OF THE INVENTION

The present invention relative to a dynamically changing, multi-color liquid crystal display for use in electronic timepieces and other designer apparel items. The liquid crystal display (LCD) comprises two generally parallel substrates having interior facing surfaces and a plurality of transparent electrodes disposed on the interior faces of the substrates that define liquid crystal display segments. The liquid crystal material used in the present invention incorporates a combination of colored dyes and is generally disposed between the two substrates. The present invention also includes a driving means for electronically controlling the liquid crystal display segments to change between a first color and a second color and shades of color therebetween by applying prescribed voltages across selected liquid crystal display segments. The liquid crystal displays incorporated within the watch or designer apparel item can be further adapted to provide various colored images such as geometric images, animation images, customized images, and the like on colored backgrounds by properly defining appropriate liquid crystal display segments. When incorporated within a watch, the dynamically changing, multi-color liquid crystal displays can be used with a conventional analog watch having time indicating hands such that the liquid crystal displays are independent of the time of day.

Accordingly, it is an object of the invention to provide a multi-color, dynamically changing liquid crystal display for use in watches and similar such designer apparel items.

Another object of the invention is to provide a dynamically changing liquid crystal display watch dial or other designer apparel item that provides electronic control of the color appearance of one or more liquid crystal displays as well as electronic control of multi-colored liquid crystal display images, such images being generally independent of the time of day.

An important advantage of the present invention is that the liquid crystal displays incorporated within the watch dial or designer apparel item provides colored segments on colored backgrounds or alternatively provides color variation from one color to another color. Such color changing capability also provides shades of the color combinations in between the two original colors. This feature allows an individual to customize the color appearance of the liquid crystal display.

Another important advantage of the present invention is that the liquid crystal displays incorporated within the watch dial or designer apparel item can be segmented and properly driven such that the liquid crystal display images can include a wide variety of multi-colored, customized images. With the present invention, multi-colored liquid crystal displays of animation images, customized images, designer labels, logos, and the like, are now possible.

Still another advantage of the present invention embodied within a watch or other timepiece, is that it provides a multi-colored, dynamically changing liquid crystal display that utilizes conventional mechanical hour and minute hands to represent the indicated time in analog form. Alternatively, another embodiment of the present invention utilizes multi-color liquid crystal display elements which are electronically activated to represent the indicated time in analog form.

Another advantage of the present invention is that unlike conventional twisted-nematic displays, the present invention does not require the use of an external polarizer. This increases the durability, allows wider viewing angles, and enhances the brightness of the present multi-color liquid crystal displays.

A feature of the invention, in some embodiments, is the use of a liquid crystal guest-host mixture comprising a negative order parameter dye and a positive order parameter dye, or a negative order parameter dye and a zero order parameter dye, or a positive order parameter dye and a zero order parameter dye to obtain aesthetic effects. In addition, the present invention can be adapted for use with conventional driving schemes used in many existing liquid crystal displays.

Still another feature of the present invention is the optional use of a single chamber liquid crystal display or a multi-chamber liquid crystal display to further customize the colors and images appearing on the watch dial or other designer apparel item. The multi-chamber liquid crystal display device offers an aesthetically pleasing appearance with a multitude of vibrant colors.

Another feature found in some embodiments of the present invention is the formation of an aperture through the multi-colored, dynamically changing liquid crystal display to accommodate the hour and minute hands in a conventional analog watch.

These and other objects, features, and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the following detailed description, reference will be made to the attached drawings in which.

DETAILED DESCRIPTION OF THE PREFERRED EMBODIMENTS

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
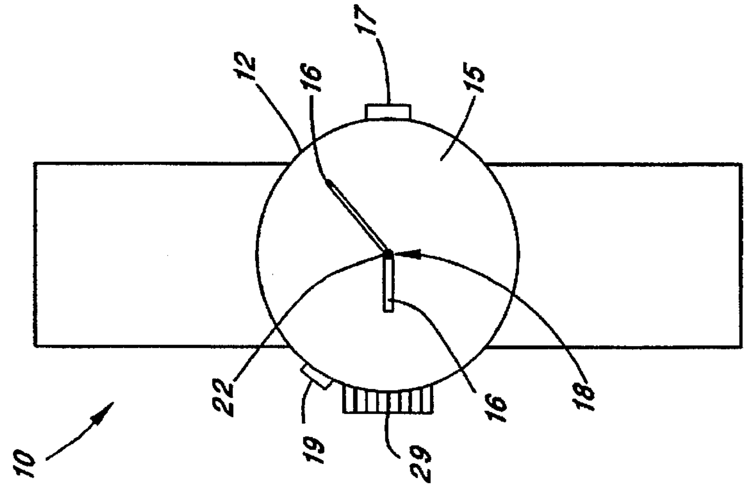
FIG. 1 shows an embodiment of the dynamically changing, multi-color watch having a single chamber liquid crystal display that dynamically changes from a first color to a second color in accordance with the present invention.
Figure 2:
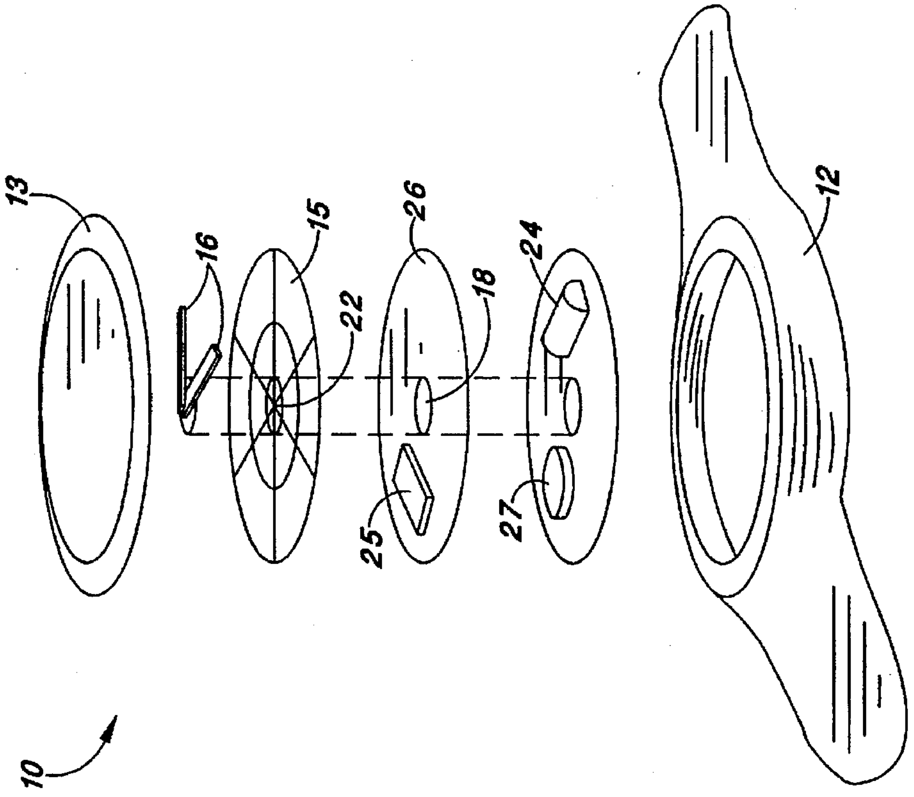
FIG. 2 shows a exploded perspective view of the watch of FIG. 1 having a dynamically changing multi-color liquid crystal display in accordance with the present invention.

FIGS. 1 and 2 illustrate a dynamically changing, multi-color liquid crystal display watch 10 that includes a watch case 12, a watch cover plate 13, a liquid crystal display watch dial 15 adapted for use in a conventional analog watch format, with the dynamically changing multi-color watch dial serving as the novel and distinguishing fashion element. The watch 10 further includes timekeeping control electronics 24 which control the analog movement of conventional mechanical timekeeping hands 16 as a function of the time of day, as is generally known in the art. The mechanical hands 16 will be attached to the movement through a seal-protected hole 18 in the liquid crystal display 15. The liquid crystal display control electronics comprise a microprocessor 25 disposed on a printed circuit board 26 dimension to be placed immediately below the liquid crystal display 15 and in electrical connection therewith. A common power source such as a battery 27 will be used for both the timekeeping function (i.e. hand movement) and controlling the microprocessor 25 for the liquid crystal display 15.

Several different color changing liquid crystal displays are contemplated for use with the invention. For example a guest-host liquid crystal display system utilizing a combination of a negative order parameter dye and a positive order parameter dye, or a negative order parameter dye and a zero order parameter dye, or a positive order parameter dye and a zero order parameter dye may be used. Order parameter indicates where the polarization axis of the dye lies with respect to incident light. Such a display is discussed in detail in U.S. Pat. No. 5,289,301 issued to inventor-applicant Donald Brewer and incorporated by reference herein. Moreover, the guest-host liquid crystal display disclosed therein is the among the best currently available methods of achieving color change due to its superior brightness, and the inherent advantage of not requiring the use of an external polarizer.

A guest dye with a positive order parameter in a guest-host mixture in a liquid crystal display exhibits a change in color from color to relatively colorless when the voltage applied across the display is raised from a minimum threshold voltage. Conversely, a guest dye with a negative order parameter in a guest-host mixture in a liquid crystal display exhibits a change in color from relatively colorless to color when the voltage applied across the display is raised from a minimum threshold voltage. Finally, a guest dye with a zero order parameter does not exhibit any change in color when the voltage applied across the display is varied, but rather will remain constant in color regardless of variations in applied voltage.

A large range of different color variations are possible depending on the particular combination of dyes used. A preferred dye combination utilizes a red positive azo dye such as Mitsui SI-426 and a yellow negative anthraquinone dye:

1,8 Bis-(4-butylbenzamido)-4,5-Bis-(4-butylbenzoyloxy)-3-methylanthraquinone which produces yellow colored display in the "on" state and a red colored background in the "off" state. Some of the preferred dyes are discussed in detail in U.S. Pat. No. 4,933,104 also incorporated by reference herein. For light shutter applications, the selected dye combination can produce a color variation from one color to the other, while also producing color combinations of the two. For example, a liquid crystal display using the preferred dyes changes from a red color to a yellow color and various shades of orange in between. Other contemplated examples utilize blue and yellow dyes which produce shades of green, or a combination of a red and blue dye producing either color or various shades of purple.

This embodiment of the invention offers the ability to custom color-coordinate the watch dial with specific outfits or customize the color depending on a variety of other criteria. For example, the owner of a blue-to-red liquid crystal display watch could customize the color of the watch dial from blue to various shades of purple to red via an accessible voltage regulating dial. Similarly, a blue-to-yellow watch can be customized or controlled by the customer to display blue, yellow, or various shades of green. Alternatively, the present two color liquid crystal display watch could be customized or controlled by the user to oscillate at a predetermined frequency between the two colors.

As described above, the watch 10 of FIG. 1 and FIG. 2 includes a watch case 12 and a multi-color liquid crystal display 15. The illustrated embodiment also has a hole or aperture 18 drilled through the liquid crystal display 15 through which mechanical hour and minute hands 16 extend to present an indication of time in an analog form. The hole or aperture 18 can be drilled through a small amount of epoxy 22 that is placed in center of the liquid crystal display 15 or, preferably, the hole 16 is drilled through a small empty chamber created in the display. This small empty chamber comprising a very small percentage of the entire display. The liquid crystal display 15 would then be placed in an analog watch 10 with the liquid crystal display 15 serving as the watch dial and the hands 16 of the analog watch 10 going through the hole 16 in the liquid crystal display 15.

In operating the liquid crystal display 15 of FIGS. 1 and 2, the user effectively controls a variable potentiometer which adjusts the magnitude of the voltage delivered across the entire liquid crystal display 15, commonly referred to as the driving voltages or operating voltages. The potentiometer is contained within the liquid crystal control unit 29 which also is adapted to control other parameters of the liquid crystal display driver. In the illustrated embodiment the liquid crystal material is ZLI-1840, commercially obtainable from E. M. Industries, which preferably utilizes an operating voltage between 1 volt or less (the "off" state and 2 volts (the "on" state). When the dyes in the liquid crystal guest-host mixture are positive and negative order parameter dyes, at 1 volt, the negative order parameter dye is relatively colorless and the positive order parameter dye is at full color, at 2 volts, the negative order parameter dye is at full color and the positive order parameter dye is relatively colorless, and at voltages intermediate between 1 volt and 2 volts, both positive and negative order parameter dyes are partially colored (between colorless and full color) at the same time, and the resulting color exhibited by the liquid crystal display will be a combination of the partially colored dyes. If, for example, one dye at full color is blue, and the other dye at full color is yellow, various shades of green will result at voltages intermediate 1 volt and 2 volt.

When the dyes in the liquid crystal guest-host mixture are positive and zero order parameter dyes, at 1 volt the positive order parameter dye is at full color and the zero order dye is at constant full color. The resulting color exhibited by the display cell will be a combination of the full color of the positive order parameter dye and the constant color of the zero order parameter dye. Thus, if the positive order parameter dye at full color is blue, and the constant color of the zero order parameter dye is yellow, at 1 volt or less applied voltage, the color exhibited will be a combination of blue and yellow, namely green. As the applied voltage across the display cell is raised, the green color will become lighter, namely more yellowish, and at full voltage across the display cell, the color thereof will be yellow.

When the dyes in the liquid crystal guest-host mixture are negative and zero order parameter dyes, at 1 volt the negative order parameter dye is relatively colorless and the zero order parameter dye is at constant full value. The resulting color exhibited by the display cell will be the color of the zero order parameter dye. When the voltage applied across display cell is raised to full operating value, the resulting color exhibited by the display cell will be a combination of the full color of the negative order parameter dye and the constant color of the zero order parameter dye. Thus, if the negative order parameter dye at full color is blue, and the constant color of the positive order parameter dye is yellow, at 1 volt applied voltage, the color exhibited will be yellow. As the applied voltage across the display cell is raised to full voltage, the yellow color will change to increasing deeper shades of green.

The user can also select the voltage oscillations of the voltage delivered across the liquid crystal display 15. Oscillations in voltage across the display cell between the 1 volt and 2 volts will result in oscillations of color between the full color of one dye and the full color of the other dye and across blended colors between the two extreme full colors. In this manner, the user can select color changes in the liquid crystal display 15 to attain the desired aesthetic effect.

Another feature of this and other embodiments is the liquid crystal display response times. Although response times for conventional liquid crystals vary significantly depending on the operating temperature, the typical response times of the liquid crystal display described herein are preferably between about 10–40 msec to turn the liquid crystal display to the "on" state and between about 20–50 msec to turn the liquid crystal display to the "off" state.

Figure 3:
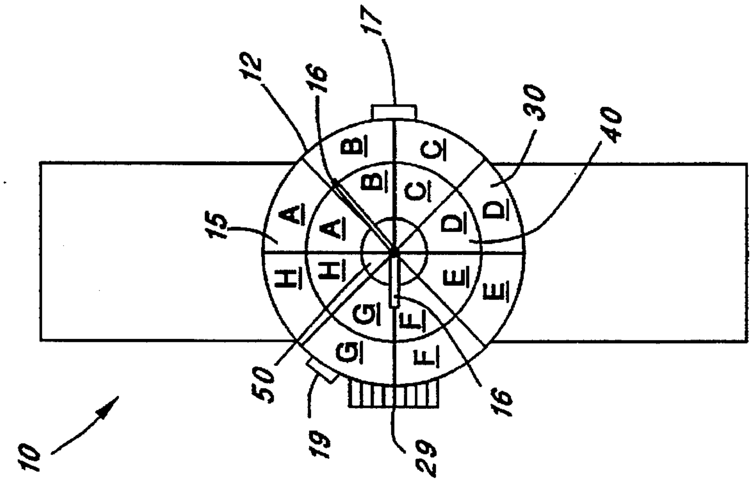
FIG. 3 shows another embodiment of the present invention illustrating a conventional analog watch having a single chamber liquid crystal display that dynamically forms a preselected color customized image on a color background when activated.

Referring now to FIG. 3, there is shown another embodiment of the present invention illustrating a conventional analog watch 10 that dynamically forms a preselected color customized image, such as the illustrated concentric circles, on a color background when activated. The watch 10 includes a watch case 12, a liquid crystal watch dial 15, mechanical hands 16, an analog watch control button 17, and a liquid crystal display mode control button 19 and control unit 29. The watch dial in this embodiment is a single chamber liquid crystal display 15 that includes a combination of a positive order parameter dye and a negative order parameter dye that preferably changes from a red color to a yellow color when activated in the manner described above. The watch 10 of FIG. 3, has eight identical segments A,B,C,D,E,F,G,H in each of the three concentric rings 30,40,50. Each of the eight segments A through H of the concentric rings 30,40,50 representing a forty five degree arc of the circular watch dial.

In this illustrated embodiment, the preferred combination of dyes are used to produce, for example, sequentially activated yellow segments (Segments 30A through 30H followed by segments 40A through 40H and 50A through 50H) on a red colored background. Alternatively any of the concentric rings 30,40,50 can be changed from a red color to a yellow color if all segments (A through H) within the concentric ring are simultaneously activated. In the illustrated embodiments, as well as other described embodiments of the present invention, the liquid crystal displays each have a transparent substrate which is preferably glass and one or more transparent electrodes which are preferably films of indium-tin-oxide (ITO) that are deposited in prescribed orientations on the interior surfaces of the substrates.

By virtue of its ability to effect simultaneous image and color change, the liquid crystal display watch face provides a practical and inexpensive format for generating a wide variety of pleasing and eye-catching dynamic images. These could include kaleidoscopic effects, animated images, geometric images, designer logos, or other recognizable images or characters.

The preferred liquid crystal material is a conventional twisted-nematic liquid crystal material with positive dielectric anisotropy such as the aforementioned ZLI-1840. The liquid crystal displays preferably change from a non-scattering color to a different non-scattering color for typical twisted-nematic liquid crystal display applications. The present invention also contemplates the use of guest-host polymer dispersed liquid crystal (PDLC) displays or encapsulated liquid crystal (NCAP) displays as more fully disclosed in co-pending U.S. patent application Ser. No. 08/033,494 filed on Mar. 18, 1993, the disclosure of which is incorporated by reference herein.

Moreover, the liquid crystal displays of the all the illustrated embodiments can be operated in reflective mode, trans-reflective, or transmissive modes with or without a backlight. A reflective display system is preferred for most timepiece applications such as watches or clocks. The reflective display system preferably incorporates a reflective surface on the underlying substrate of the display. The highly reflective surface typically consists of a thin film of aluminum, silver, gold or other highly reflective material. Alternatively, a trans-reflective display system with a backlight means such as an electroluminescent display offers some very appealing aesthetic effects.

Figure 4:
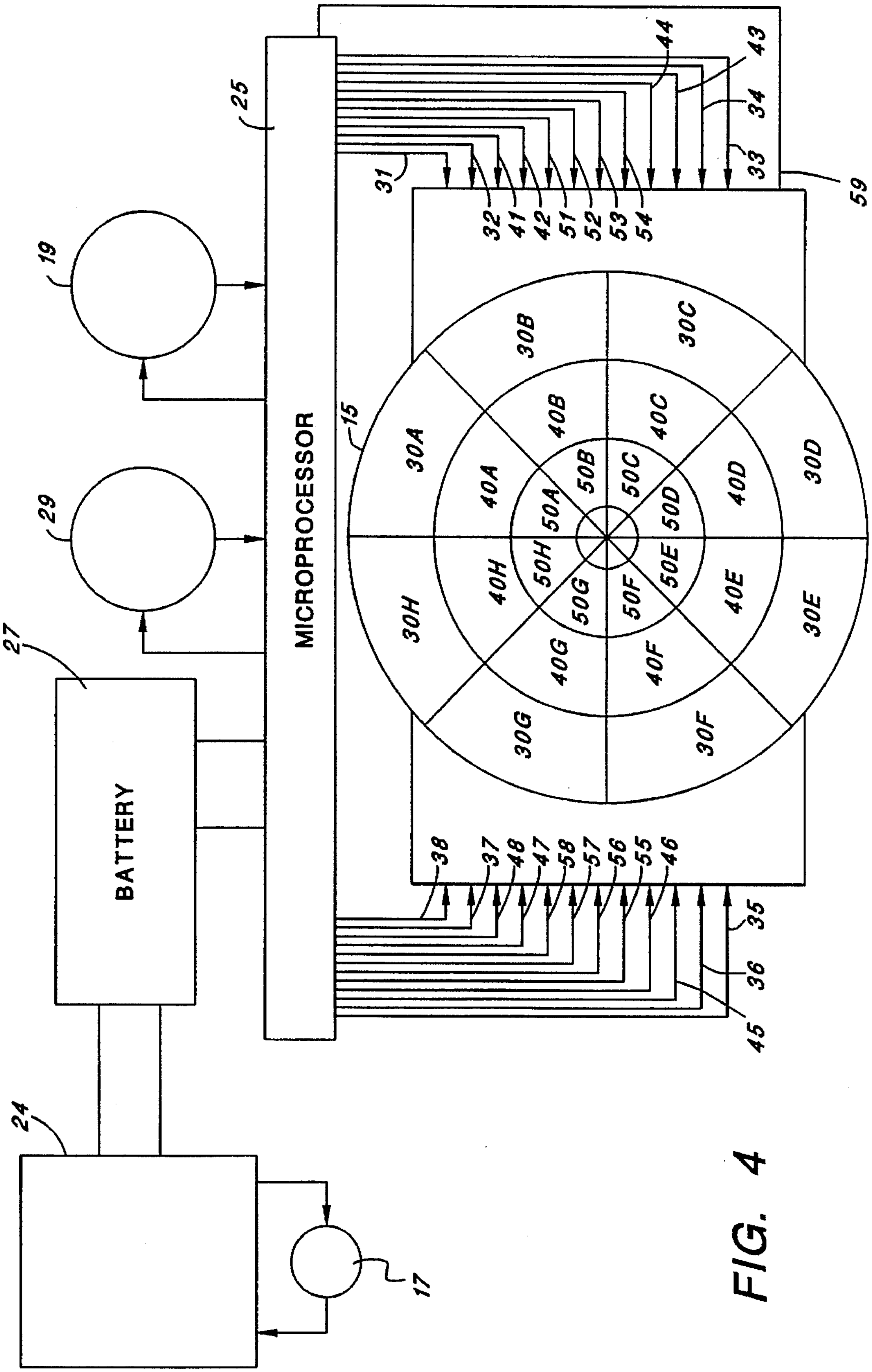
FIG. 4 is a block diagram of the embodiment illustrated in FIG. 3 generally depicting the plurality of electrical connections and driving means associated with the dynamically changing, multi-color liquid crystal display.

FIG. 4 is a block diagram of the embodiment illustrated in FIG. 3 generally representing the plurality of electrical connections and the driving means associated with the liquid crystal display. In the illustrated embodiment there are twenty-four electrode segments corresponding to the desired image or images to be displayed are placed on the upper substrate of the liquid crystal display. In addition there is one common electrode conforming generally to the shape of the watch dial placed on the lower substrate. The portion of the liquid crystal material disposed between each of the transparent electrodes on the upper substrate and the single electrode on the lower substrate define a plurality of liquid crystal display segments.

Each of the twenty-four electrode segments segments 30A through 30H, 40A through 40H, and 50A through 50H, are individually connected to the microprocessor, as represented by electrical connections 31–38, 41–48, and 51–58, respectively. The common electrode is connected to the microprocessor by electrical connections 59. Input commands or signals to the microprocessor originate from the liquid crystal display mode control button 19 as well as the liquid crystal display control unit 29. A battery 27 is preferred power source for both the electronic timekeeping circuits 24 (quartz movement) and controlling the microprocessor 25 for the liquid crystal display 15. The plurality of electrode segments 30A through 30H, 40A through 40H, and 50A through 50H, on the upper substrate and the common electrode segment (not shown) on the lower substrate of the liquid crystal display 15 are selectively activated by the microprocessor 25 to establish electric fields of varying magnitudes which effectuates changes in each liquid crystal display segment between an active state and an inactive state. The prescribed voltages applied across the various electrodes may occur in accordance with a predetermined sequence or, if desired, may occur in a more random fashion. Regardless of the driving mechanism, each liquid crystal display segments produces a first color when the liquid crystal display segment is placed in the inactive state and a second color when the liquid crystal display segments are placed in the active state. Advantageously, the liquid crystal display segments and the images that are displayed may be independent of the time of day.

The driving electronics is a 4 or 8 bit microprocessor, which has a built in liquid crystal driving mechanism, as is generally known in the art. The embodiments of the dynamically changing, multi-color liquid crystal display can be adapted to operate in a static or single level multiplexing (i.e. full duty cycle), 2 level multiplexing (½ duty cycle), 3 level multiplexing (⅓ duty cycle), or even 4 level multiplexing (¼ duty cycle). For more intricate displays, it may be desirable to produce an application specific integrated circuit tailored to the liquid crystal display dynamics.

Figure 5:
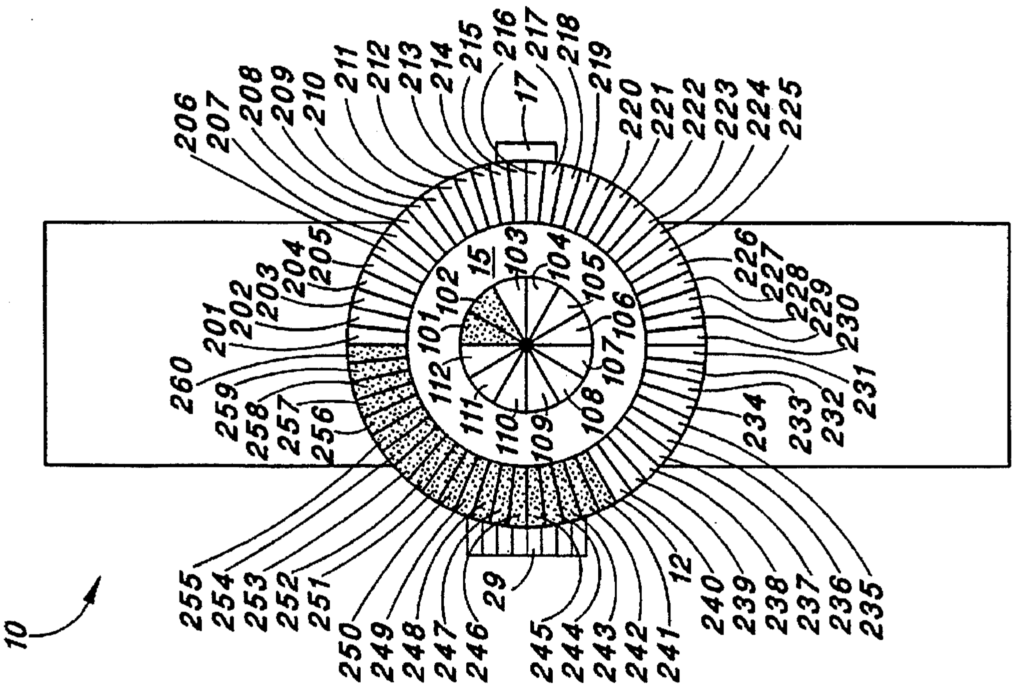
FIG. 5 illustrates an electronic watch having a single chamber liquid crystal display and a plurality of electrode segments that dynamically simulates the indicated time in analog form in accordance with the present invention.

FIG. 5 illustrates an embodiment of the present invention that includes a watch case 12 and a multi-color liquid crystal display 15 which presents time information in a substantially conventional format. Like, the previous embodiments, the watch 10 includes a watch case 12, a liquid crystal watch dial 15, an timekeeping control button 17, and a liquid crystal display control unit 29. The multi-color liquid crystal display 15 also includes sixty liquid crystal display elements, 201 through 260, on the outer periphery of the liquid crystal display 15 to provide an indication of minutes. The liquid crystal display 15 further includes an inner circle of twelve display elements, 101 through 112, which provide an appropriate indication of the present hour. In the illustrated embodiment the time presented is 2:40 and is characterized by activating the inner liquid crystal display elements 101 and 102 (i.e. in an "on" state) while maintaining the rest of the inner liquid crystal display elements, 103 through 112, in an "off" state. On the outer periphery, the display elements 201 through 240 are inactive while display elements 241 through 260 are active. By using a combination of dyes, as described above, the active elements in the illustrated embodiment are displayed in a first color, preferably red, while the inactive display elements appear as a second color, such as yellow.

The exact number of display elements in the inner circle and outer periphery can be tailored for various watch designs. For example, a twenty four element inner display may be appropriate for individuals who regularly use military time. Similarly, the outer periphery may be limited to twenty or twelve display elements where the exact minute is not of particular importance. The present embodiment also has appropriate controls accessible by the individual to control certain aspects of the liquid crystal display such as present time indication, shades of the presented colors, etc.

Figure 6:
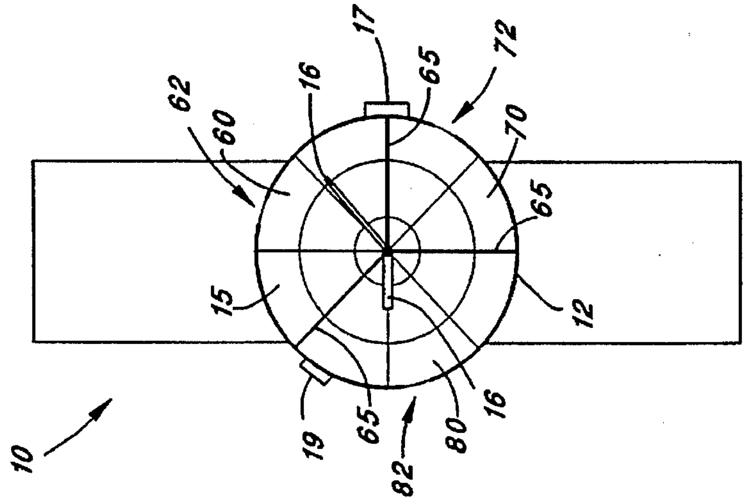
FIG. 6 shows an embodiment of the present invention illustrating a conventional analog watch having a multi-chamber liquid crystal display wherein each chamber dynamically changes from one color to another color.

In other embodiments, illustrated generally in FIG. 6, the use of the guest-host liquid crystal display method offers a very unique appearance, since several different guest-host liquid crystal mixtures could be filled into one liquid crystal display having a plurality of separate chambers 60,70,80. The chambers 60,70,80 are sealed from one another with an epoxy material 65 disposed within the liquid crystal display 15. Much like the previously discussed embodiments, this watch 10 includes a watch case 12, a liquid crystal watch dial 15, mechanical hands 16, an analog watch control button 17, and a liquid crystal display control button 19 which are operatively associated with internally placed electronic timekeeping circuits and the liquid crystal display microprocessor, respectively. Each of the separate chambers 60,70,80 also has a separate fill port 62,72,82 at the outer periphery of each chamber. A different guest-host mixture which contains dyes with different properties (i.e. different colors and positive order, zero order, or negative order parameters) would preferably fill each of the separate chambers 60,70,80. The resulting effect is a liquid crystal display 15 that produces an aesthetically pleasing appearance with a multitude of different colors changing into other colors with the application of a voltage to the various electrodes within each chamber of the liquid crystal display system.

The observed effect would be for example, a liquid crystal display that has one chamber 60 that contains fluid that changes from blue to yellow, while another chamber 70 contains fluid that changes from red to blue, and another chamber 80 contains fluid that changes form yellow to purple. The combination of these different mixtures within a single liquid crystal display system, coupled with appropriate electronic driving method results in a unique aesthetic appearance not achievable with any other existing low cost liquid crystal display technology.

The present invention and its advantages will be understood from the foregoing description, and it will be apparent that various changes may be made in the form, construction and arrangement of the parts thereof without departing from the spirit and scope of the invention or sacrificing all of its material advantages, the forms hereinbefore described being merely exemplary embodiments thereof. For example, the multi-color, dynamically changing liquid crystal display is contemplated for use in many designer apparel items, novelty items, instrument displays, touchpanels, light filters color shutters, toys, and other consumer products.

To that end, it is not intended that the scope of the invention be limited to the specific embodiments illustrated and described. Rather, it is intended that the scope of this invention be determined by the appending claims and their equivalents.

What is claimed is:

1. A dynamically changing, multi-color liquid crystal display electronic timepiece comprising:

a multi-color liquid crystal display including at least one liquid crystal display segment and further having an aperture;

a sealing means for hermetically sealing the liquid crystal display around the aperture;

an electronic timepiece having time indicating hands for analogically representing the time, the time indicating hands extending from the aperture and operatively associated with the electronic timepiece; and a means for electronically controlling the liquid crystal display segments to dynamically change between an active state and an inactive state by generating prescribed voltages applied across the liquid crystal display segments in a predetermined sequence independent of the time of day indicated by the electronic timepiece;

wherein the at least one liquid crystal display segment produces a first color when the liquid crystal display segment is placed in the inactive state and a second color when the liquid crystal display segment is placed in the active state, and wherein the color of the liquid crystal display thereby changes in a predetermined fashion independent of the time of day.

2. The electronic timepiece of claim 1 wherein the means for electronically controlling the liquid crystal display segments is further adapted to change between a fully active state, partially active states, and an inactive state, and in response to the prescribed voltages applied across the liquid crystal display segments the liquid crystal display produces shades of color between the first and second colors when the liquid crystal display segments are placed in the partially active state.

3. The electronic timepiece of claim 2 wherein the multi-color liquid crystal display further comprises:

two generally parallel substrates having interior facing surfaces;

a plurality of transparent electrodes disposed on the interior faces of the substrates that define liquid crystal display segments;

a liquid crystal material disposed between the two substrates; and a combination of dyes incorporated in the liquid crystal material;

whereby the liquid crystal display segments exhibit selected color changes ranging between a first color and a second color in response to prescribed voltages applied across selected liquid crystal display segments by the controlling means.

4. The electronic timepiece of claim 3 wherein the combination of dyes comprises a positive order parameter dye and a negative order parameter dye.

5. The electronic timepiece of claim 3 wherein the combination of dyes comprises a positive order parameter dye and a zero order parameter dye.

6. The electronic timepiece of claim 3 wherein the combination of dyes comprises a negative order parameter dye and a zero order parameter dye.

7. The electronic timepiece of claim 3 wherein the liquid crystal display comprises a multi-chamber liquid crystal display having a plurality of sealed chambers wherein each chamber includes:

a plurality of transparent electrodes that define liquid crystal display segments for each chamber;

a liquid crystal material; and a different combination of the colored dyes;

whereby the liquid crystal display segments within each chamber exhibit selected color changes ranging between a first color and a second color in response to prescribed voltages applied across selected liquid crystal display segments within each chamber by the controlling means.

8. The electronic timepiece of claim 3 further comprising a means for customizing the liquid crystal display to a selected color, the selected color ranging between the first color and the second color and shades of colors therebetween.

9. The electronic timepiece of claim 3 wherein the plurality of transparent electrodes are arranged in a prescribed orientation so as to present images generally independent of the time of day.

10. The electronic timepiece of claim 3 wherein the plurality of transparent electrodes are arranged in a prescribed orientation so as to present geometric images, animation images, customized images, logos, or other recognizable images.

11. A dynamically changing, multi-color liquid crystal display for designer apparel items comprising:

two generally parallel substrates having interior facing surfaces;

a plurality of transparent electrodes disposed on the interior faces of the substrates that define liquid crystal display segments;

a liquid crystal material disposed between the two substrates;

at least one dye incorporated in the liquid crystal material; and a means for electronically controlling the liquid crystal display segments to dynamically change between an active state and an inactive state by applying prescribed voltages across the liquid crystal display segments in a predetermined fashion independent of the time of day;

wherein the liquid crystal display segments exhibit selected color changes between a first color and a second color in response to prescribed voltages applied across selected liquid crystal display segments by the controlling means.

12. The dynamically changing, multi-color liquid crystal display for designer apparel items of claim 11 wherein the combination of dyes comprises a positive order parameter dye and a negative order parameter dye.

13. The dynamically changing, multi-color liquid crystal display for designer apparel items of claim 11 wherein the combination of dyes comprises a positive order parameter dye and a zero order parameter dye.

14. The dynamically changing, multi-color liquid crystal display for designer apparel items of claim 11 wherein the combination of dyes comprises a negative order parameter dye and a zero order parameter dye.

15. The dynamically changing, multi-color liquid crystal display for designer apparel items of claim 11 wherein the liquid crystal display comprises a multi-chamber liquid crystal display having a plurality of sealed chambers wherein each chamber includes:

a plurality of transparent electrodes that define liquid crystal display segments for each chamber;

a liquid crystal material; and a different combination of the colored dyes;

wherein the liquid crystal display segments within each chamber exhibit selected color changes between a first color and a second color in response to prescribed voltages applied across selected liquid crystal display segments within each chamber by the controlling means, with the color changes occurring in a sequence unrelated to the time of day.

16. The electronic timepiece of claim 11 further comprising a means for customizing the liquid crystal display to a selected color, the selected color ranging between the first color and the second color and shades of colors therebetween.

17. The electronic timepiece of claim 11 wherein the plurality of transparent electrodes are arranged in a prescribed orientation so as to present geometric images, animation images, customized images, logos, or other recognizable images.

18. A dynamically changing, multi-color liquid crystal display for electronic timepieces comprising:

two generally parallel substrates having interior facing surfaces;

a plurality of transparent electrodes disposed on the interior faces of the substrates that define liquid crystal display segments;

a liquid crystal material disposed between the two substrates;

at least one dye incorporated in the liquid crystal material; and a means for electronically controlling the liquid crystal display segments to dynamically change between an active state and an inactive state in a predetermined sequence independent of the time of day by applying prescribed voltages across the liquid crystal display segments in the predetermined sequence;

wherein the liquid crystal display segments dynamically exhibit selected color changes between a first color and a second color in response to prescribed voltages applied across selected liquid crystal display segments by the controlling means.

19. A watch having a multi-colored watch face comprising:

a liquid crystal display (LCD) watch face made from at least one multi-color LCD segment, said watch face having a sealed aperture therethrough;

a timepiece that provides an indication of the time of day;

time-indicating hands operatively associated with the timepiece through the sealed aperture such that movement of the time-indicating hands provides an indication of the time of day;

control means for dynamically controlling the color of the LCD watch face so that color changes occur in at least a portion of the watch face independent of the time of day; and a power source for providing operating power to the electronic timepiece and control means.

20. The watch as set forth in claim 20 wherein the control means includes means for controlling the color changes that occur in at least a portion of the LCD watch face so that such color changes occur in a predetermined sequence that provides a dynamically changing animated image.

21. The watch as set forth in claim 20 wherein the control means includes means for controlling the color changes that occur in at least a portion of the LCD watch face so that such color changes occur in a predetermined sequence that provides a dynamically changing kaleidoscopic effect.

22. The watch as set forth in claim 20 wherein the control means includes means for controlling the color changes that occur in at least a portion of the LCD watch face so that such color changes occur in a predetermined sequence that provides a dynamically changing logo or similar recognizable image or character.

23. The watch as set forth in claim 20 wherein the control means includes means for controlling the color changes that occur in at least a portion of the LCD watch face so that such color changes occur in a random fashion.

* * * * *

UNITED STATES PATENT AND TRADEMARK OFFICE

CERTIFICATE OF CORRECTION

PATENT NO. : 5,636,185 Page 1 of 1
APPLICATION NO. : 08/402008
DATED : June 3, 1997
INVENTOR(S) : Brewer et al.

It is certified that error appears in the above-identified patent and that said Letters Patent is hereby corrected as shown below:

Col 12 line 47
Claim 20, change “claim 20” to --claim 19--.

Col 12 line 52
Claim 21, change “claim 20” to --claim 19--.

Col 12 line 57
Claim 22, change “claim 20” to --claim 19--.

Col 12 line 63
Claim 23, change “claim 20” to --claim 19--.

Signed and Sealed this

Twenty-second Day of August, 2006

JON W. DUDAS
*Director of the United States Patent and Trademark Office*